US008886725B2

(12) United States Patent
Rees et al.

(10) Patent No.: US 8,886,725 B2
(45) Date of Patent: Nov. 11, 2014

(54) MERGING INSTANCES OF A MODULAR DOCUMENT

(75) Inventors: Robert Thomas Owen Rees, Newport (GB); Roger Brian Gimson, Bristol (GB); Helen Balinsky, Cardiff Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 12/511,513

(22) Filed: Jul. 29, 2009

(65) Prior Publication Data
US 2011/0029594 A1 Feb. 3, 2011

(51) Int. Cl.
 *G06F 15/16* (2006.01)
 *G06F 17/22* (2006.01)
 *G06F 17/24* (2006.01)

(52) U.S. Cl.
 CPC .......... *G06F 17/243* (2013.01); *G06F 17/2288* (2013.01)
 USPC .......................................... 709/205; 715/229

(58) Field of Classification Search
 USPC .................... 709/205; 715/229; 717/101–103
 See application file for complete search history.

(56) References Cited

U.S. PATENT DOCUMENTS

| | | | | |
|---|---|---|---|---|
| 7,200,668 B2* | 4/2007 | Mak et al. | ...................... | 709/230 |
| 7,290,251 B2* | 10/2007 | Livshits | ........................ | 717/143 |
| 7,337,388 B2* | 2/2008 | Barnett et al. | ................. | 715/229 |
| 7,340,534 B2* | 3/2008 | Cameron et al. | .............. | 709/246 |
| 7,401,291 B2* | 7/2008 | Ramaley et al. | ............... | 715/255 |
| 7,478,170 B2* | 1/2009 | Ong et al. | ...................... | 709/246 |
| 7,516,157 B2* | 4/2009 | Cameron et al. | ...................... | 1/1 |
| 7,523,121 B2* | 4/2009 | Hoang et al. | .......................... | 1/1 |
| 7,614,038 B2* | 11/2009 | Poole | ............................ | 717/113 |
| 7,865,465 B2* | 1/2011 | Vierich et al. | ................. | 707/615 |
| 7,899,883 B2* | 3/2011 | Rasmussen et al. | .......... | 709/217 |
| 8,620,858 B2* | 12/2013 | Backholm et al. | ............. | 707/609 |
| 2003/0172113 A1* | 9/2003 | Cameron et al. | .............. | 709/204 |
| 2003/0172168 A1* | 9/2003 | Mak et al. | ..................... | 709/230 |
| 2003/0182450 A1* | 9/2003 | Ong et al. | ..................... | 709/246 |
| 2004/0088332 A1* | 5/2004 | Lee et al. | ...................... | 707/200 |
| 2004/0225670 A1* | 11/2004 | Cameron et al. | .............. | 707/101 |
| 2006/0117075 A1* | 6/2006 | Cowan et al. | .................. | 707/203 |
| 2006/0143034 A1* | 6/2006 | Rothermel et al. | ................ | 705/1 |
| 2008/0104493 A1 | 5/2008 | Rees | | |
| 2008/0104497 A1 | 5/2008 | Lumley | | |
| 2008/0104504 A1 | 5/2008 | Gimson | | |
| 2008/0104508 A1 | 5/2008 | Lumley | | |
| 2010/0169269 A1* | 7/2010 | Chandrasekaran | ........... | 707/608 |
| 2010/0198871 A1* | 8/2010 | Stiegler et al. | ................ | 707/783 |

OTHER PUBLICATIONS

Lumley et al., U.S. Appl. No. 12/482,646 entitled "Updating Electronic Documents" filed Jun. 11, 2009, 21 pages.

(Continued)

*Primary Examiner* — Douglas Blair (57) ABSTRACT

A first instance of a modular document is received, where the modular document is composed of plural parts, and where the modular document contains a merge definition. A second instance of the modular document is received, where the second instance and the first instance of the modular document have been modified with respect to each other. The second instance is merged with the first instance, where any conflict between the second instance and the first instance is resolved according to the merge definition.

25 Claims, 5 Drawing Sheets

(56) References Cited

OTHER PUBLICATIONS

Rees et al., U.S. Appl. No. 12/483,036 entitled "Rendering Definitions" filed Jun. 11, 2009, 25 pages.

Rees et al., U.S. Appl. No. 12/537,493 entitled "Providing an Access Mechanism Associated With a Document Part to Determine an Action to Take If Content of the Document Part Is Inaccessible" filed Aug. 7, 2009, 24 pages.

Gimson et al., U.S. Appl. No. 12/511,500 entitled "Synchronizing a Change of a Modular Document" filed Jul. 29, 2009, 23 pages.

Rees et al., U.S. Appl. No. 12/511,507 entitled "Sending a Subset of Component Documents of a Modular Document to an Electronic Device" filed Jul. 29, 2009, 20 pages.

Gimson et al., U.S. Appl. No. 12/511,523 entitled "Associating Version Information With a Component Document of a Modular Document" filed Jul. 29, 2009, 25 pages.

* cited by examiner

MERGING INSTANCES OF A MODULAR DOCUMENT

BACKGROUND

It is common to share documents between users to allow for review of, or remote collaboration in creation of, the documents. The document may be a word processing document that is initially authored by first user. The first user may then provide a copy of the document to a second user for the second user to review and possibly modify. This review and modification process may involve one or more additional users. Also, the first user may modify the document.

A result of the modification(s) made to the multiple copies of the documents may be that a particular part of the multiple copies of the documents may have been modified in different ways. In other words, there may be multiple versions of the particular part of the document. When a merge of the multiple versions of the document is later attempted, some conventional mechanisms present markers to a user indicating existence of a conflict in the different versions of the document. A user would then manually resolve the conflict, which may be tedious and time-consuming.

BRIEF DESCRIPTION OF THE DRAWINGS

Some embodiments of the invention are described with respect to the following figures.

DETAILED DESCRIPTION

Documents can be in modular form to provide for enhanced flexibility and improved efficiency. A "modular document" refers to a document that is composed of separately identifiable component documents. A "document" refers to a container of data that is identifiable.

The component documents of a source document are combined to allow for proper presentation (e.g., viewing or listening) of the modular document. Combining the component documents also achieves a desired behavior of the modular document (e.g., load appropriate objects such as images or text, retrieve variable data from a selected source or sources, etc.). Some component documents can be shared by multiple modular documents, and any one of the component documents of a modular document can be modified or replaced. A modular document generally refers to any data structure container that has references to other documents that in combination make up the modular document.

Under certain scenarios, it may be desirable to share a modular document among multiple users. To enable such sharing, one or more instances of the modular document can be provided to one or more corresponding users. An "instance" of a modular document refers to either a modified version or unmodified copy of the modular document. The original modular document can be referred to as a "first" instance of the modular, while a copy or different version of the modular document can be referred to as a "second" instance of the modular document.

Modifications can be made by users to the first instance of a modular document and/or the one or more second instances of the modular document. At a later point in time, an attempt can be made to merge the first instance with one or more of the second instances. In performing the merge, it may be the case that there may be conflicts between different instances of the modular document, where the different instances have become different versions by having different modifications performed on them. For example, a first user may have modified a particular part of one of the instances in a first manner, while another user has modified the same part in another instance of the modular document in a second manner. In such a scenario, conflict resolution is performed when merging different instances of the same modular document.

Some conventional techniques involve presenting a marker of a conflict existing in different versions of a document to a user for the user to manually perform the conflict resolution. In a large modular document where there can be many conflicts between different versions of the modular document, such a manual process of conflict resolution is not efficient.

In accordance with some embodiments, to perform conflict resolution between two or more different instances of a modular document, a merge definition can be provided in the modular document. The merge definition provides information regarding how conflicts are to be resolved. For example, the merge definition can indicate that a newer version of a part of any document replaces an older version of the same part. Whether a version is newer or older can be based on timestamps associated with the versions. Alternatively, the merge definition can specify that a change made by a higher-level user takes precedence over a change made by a lower-level user. The levels of the user can be defined by the hierarchy of an enterprise, (e.g., company, government agency, educational organization and so forth), where an example of a higher-level user is a supervisor, manager, director, or officer. Other types of merge definitions can be defined in other scenarios.

By incorporating a merge definition into the modular document, conflict resolution can be defined on a per-modular document basis, such that a generic conflict resolution policy does not have to be defined across all modular documents. A generic conflict resolution policy that applies to all documents may not take into account various scenarios or specifications.

During a merge process of multiple instances of the modular document, the merge definition of the modular document is accessed to determine how any conflicts between the different instances are resolved. Merging of the multiple instances of the modular document that are different versions of the modular document causes a single instance that is the merged document to be created.

In one example, a modular document can include the following component documents: a component document containing branding information (such as company logo) that is added to an output of the modular document; a component document containing style information related to the modular document; a component document containing legal notices; a component document containing product images; a component document containing descriptions of a product; a component document containing terms and conditions associated with the sale of a product; and so forth. By using a modular document that is composed of multiple component documents, it is possible to modify the modular document by changing just one or more of the component documents. This enhances efficiency since the entire modular document does not have to be changed in response to a change in the component document.

As discussed above, a modular document is made up of component documents. In alternative embodiments, each document (a modular document or a component document) can include parts. For example, the parts of a document can include a data part, a style part, an image part, and so forth. A document may be constructed from parts of another document. For example, one document may refer to and re-use just the style and image parts of another document. As a result, in these embodiments, a dependency reference can identify both a component document plus the part of the component document to be used in the construction. More generally, a "part" of a document refers to a portion less than the entirety of the document. One example type of a part of a document is a component document as discussed above.

The ensuing discussion refers to merge processes for merging multiple instances of modular documents containing component documents—however, it is noted that the same or similar techniques are applicable for merging multiple instances of modular documents containing parts.

Figure 1:
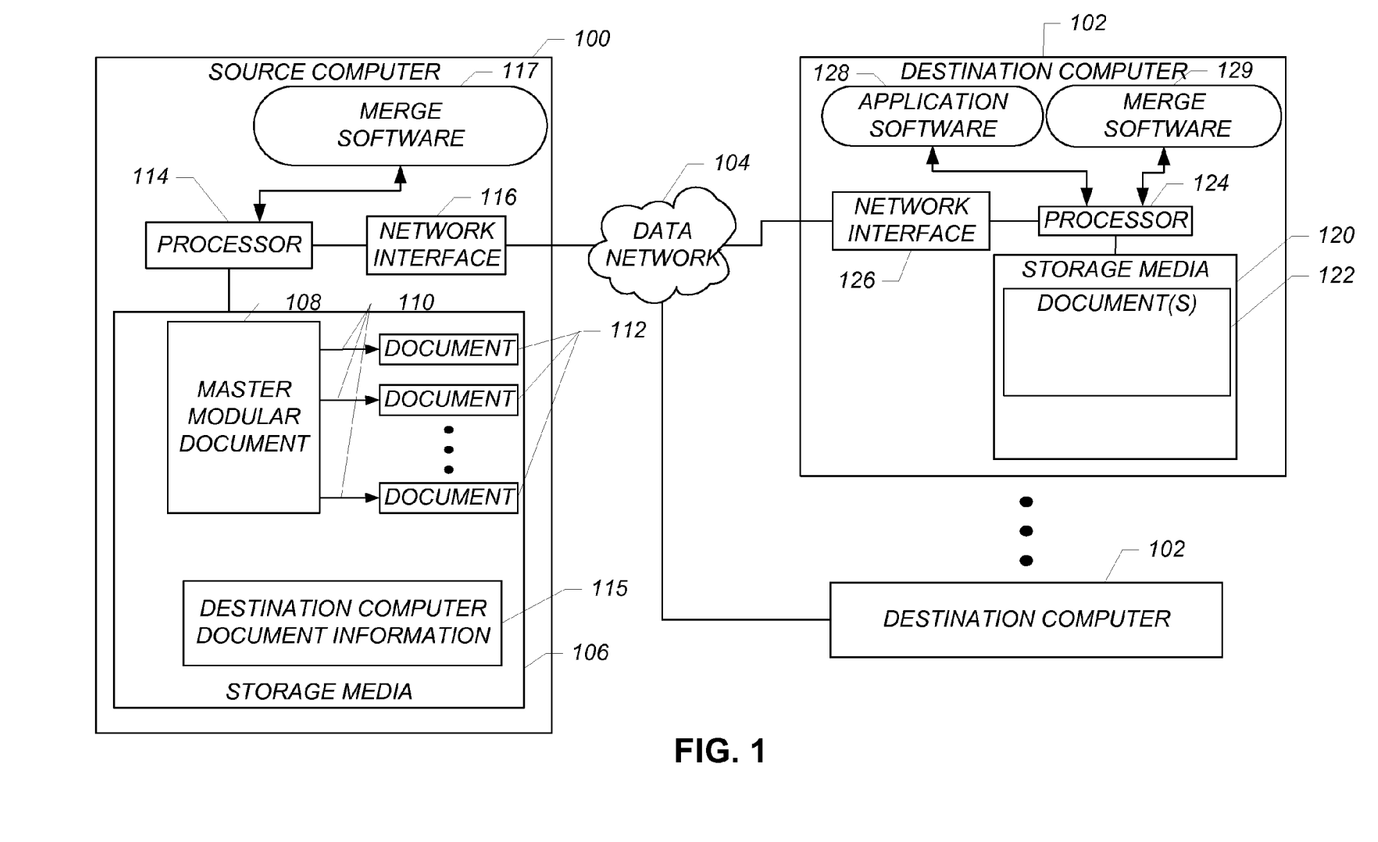
FIG. 1 is a block diagram of an exemplary arrangement that includes multiple computers, in which an embodiment of the invention can be incorporated.

FIG. 1 is a block diagram of an exemplary arrangement that includes a source computer 100 (or other source electronic device) and one or more destination computers 102 (or other destination electronic devices) that are coupled over a data network 104 to the source computer 100. Examples of the data network 104 include any one or more of a local area network (LAN), a wide area network (WAN), the Internet, and so forth (whether wired or wireless).

The source computer 100 includes storage media 106, which can be implemented with one or more disk-based storage devices and/or one or more integrated circuit (IC) or semiconductor memory devices. As shown in the example in FIG. 1, the storage media 106 contains a modular document 108 that references 110 multiple component documents 112. Although just one modular document 108 is shown, it is noted that the storage media 106 can contain more than one modular document.

It is also noted that in some applications, at least one of the component documents 112 can itself be a modular document that references other component documents. Thus, generally, a first modular document can reference component documents, where it is possible that at least one of the component documents is a second modular document that in turn references additional component documents. Moreover, it is also possible that at least one of the additional component documents is a third modular document that references further component documents. This hierarchical referencing of modular documents can be performed to any depth.

The storage media 106 also stores destination computer document information 115, which contains information identifying documents that are stored at a particular one of the destination computers 102. For example, the destination computer document information 115 can indicate which component documents are available at the particular destination computer 102. The destination computer document information 115 can be used to determine which component documents of the modular document 108 are to be sent to the particular destination computer 102 when sending a copy of the modular document 108 to the particular destination computer 102.

The source computer 100 further includes a processor 114 connected to the storage media 106. The processor 114 is connected to a network interface 116 that allows the source computer 100 to communicate over the data network 104 with the destination computers 102.

In addition, the source computer 100 includes a modular document merge software 117 that manages merging of conflicting versions of a modular document in accordance with some embodiments.

As further shown in FIG. 1, a destination computer 102 includes a storage media 120 that contains one or more modular documents 122, which can be instances of modular documents at the source computer 100. The storage media 120 is connected to a processor 124, which is connected to a network interface 126 to allow the destination computer 102 to communicate over the data network 104. The destination computer 102 also includes application software 128 that is executable on the processor 124. The application software 128 can be a word processing software, a web browser, or any other software that is able to process and present modular documents.

The destination computer 102 further has a modular document merge software 129 that is executable on the processor 124 to merge different versions of a modular document.

Figure 2:
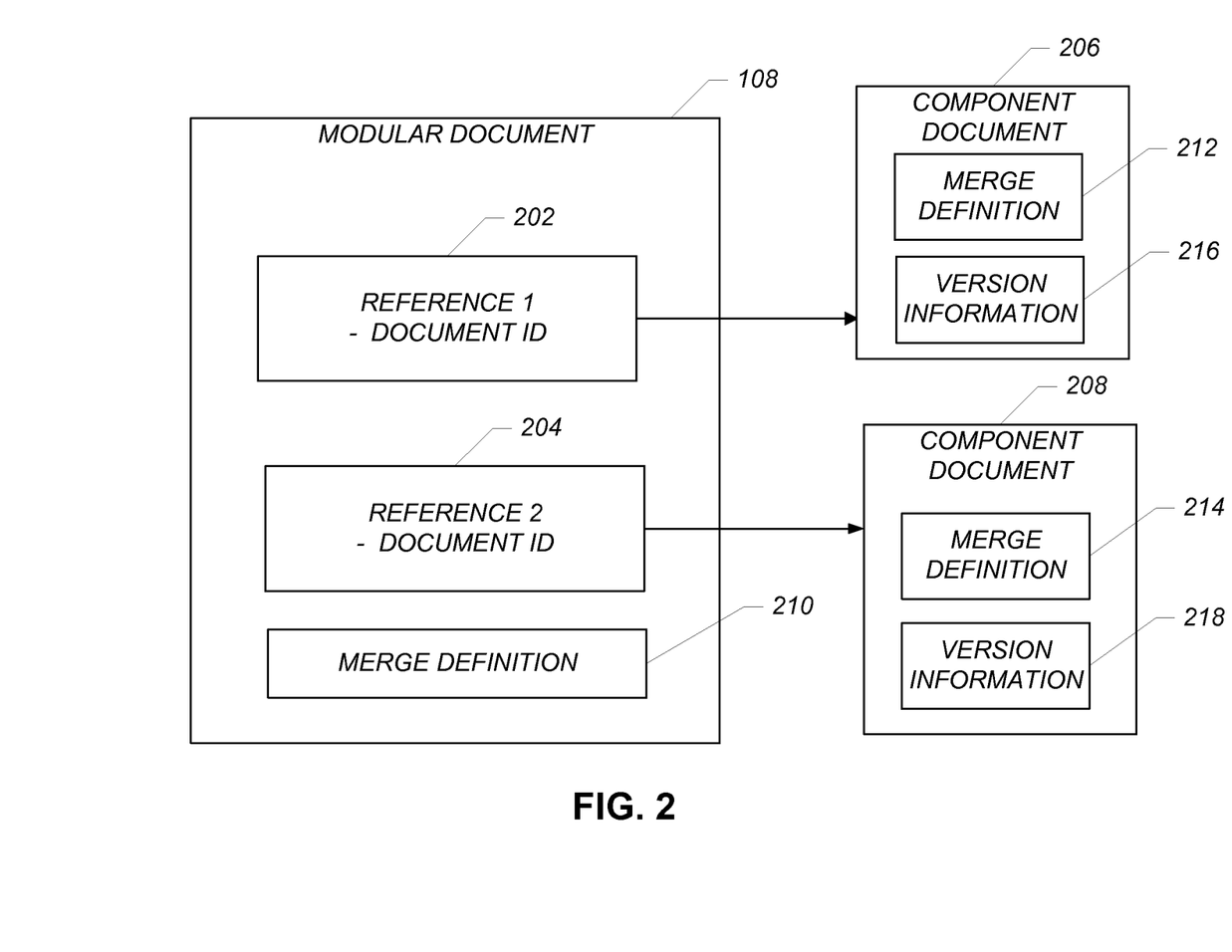
FIG. 2 is a schematic diagram of a modular document containing references to component documents, according to an embodiment.

FIG. 2 illustrates an example of the modular document 108. The modular document 108 contains references 202, 204 to corresponding component documents 206 and 208. In the example of FIG. 2, the first reference 202 contains a document identifier (which uniquely identifies the component document 206). The second reference 204 contains a document identifier for the component document 208.

In accordance with some embodiments, a merge definition 210 is contained in the modular document 108, and merge definitions 212 and 214 can also be contained in component documents 206 and 208, respectively. When a second instance of the modular document 108 is created, the merge definitions 210, 212, and 214 can be copied to the second instance. It is possible that the merge definitions associated with modular document 108 (first instance) and the merge definitions associated with the second instance are subjected to different modifications, which can cause such merge definitions to also have conflicts. To address this issue (as discussed further below), additional merge definitions at different hierarchical levels can be defined to resolve merge definition conflicts.

Each component document 206 and 208 further includes respective version information 216 and 218, to identify the version of the respective component document.

Figure 2A:
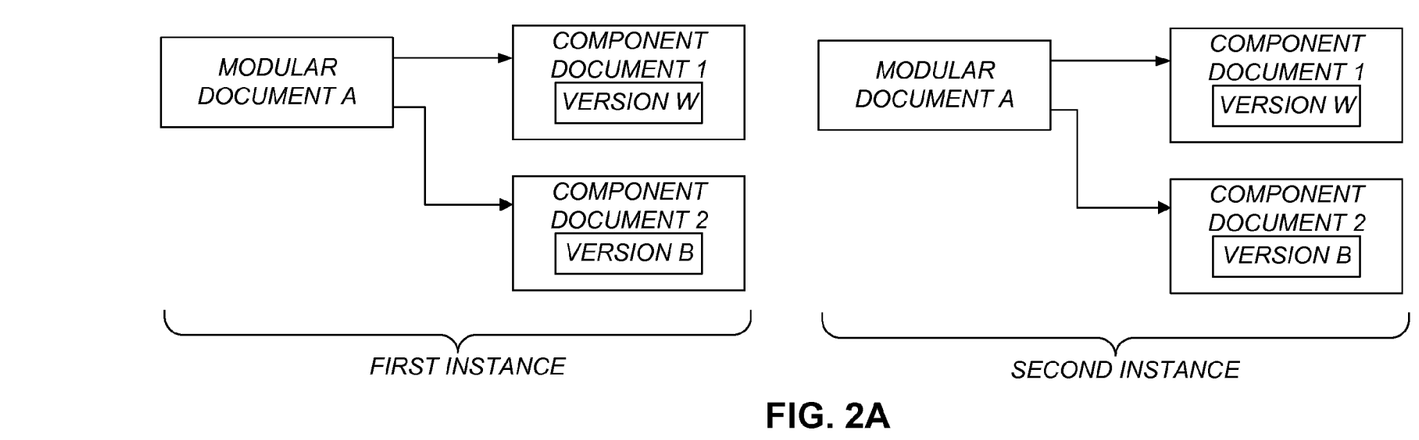
FIGS. 2A-2B illustrate an example in which a component document of a modular document has been modified differently in different instances, for which a merge process according to an embodiment can be applied.
Figure 2B:
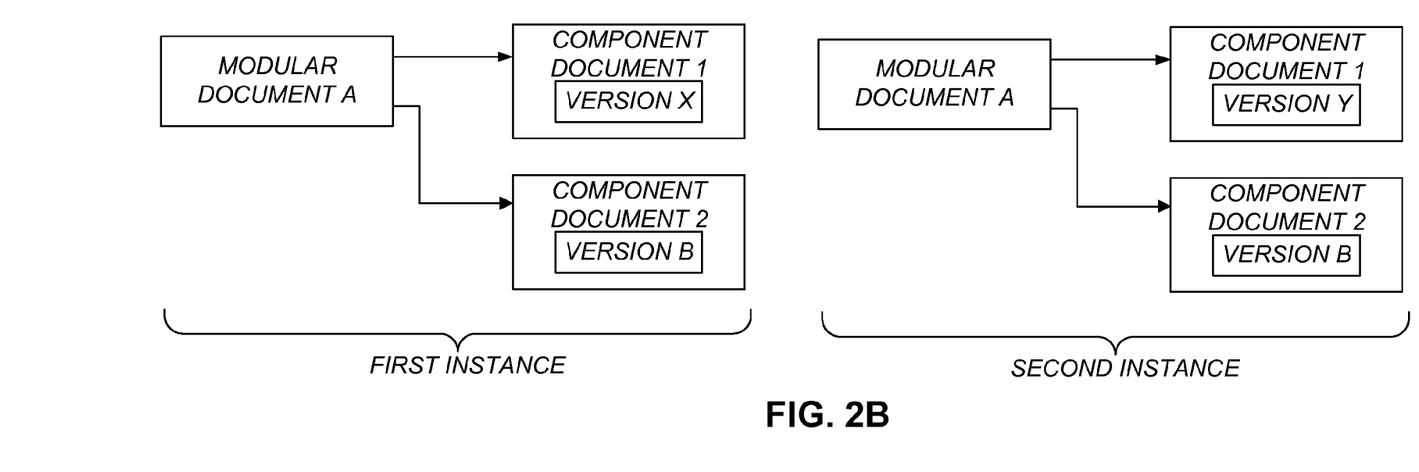

FIGS. 2A and 2B illustrate an example based on the structure of FIG. 2. In FIG. 2A, a first instance and second instance of modular document A are provided, where at the point in time represented by FIG. 2A, the first and second instances of modular document A are identical copies, since both instances refer to version W of component document 1 and to version B of component document 2. At a later point in time, as represented by FIG. 2B, users may have modified component document 1 for each instance of modular document A such that component document 1 of the first instance has been modified to version X, and component document 1 of the second instance has been modified to version Y. Both versions X and Y of component document 1 are successors to version W of component document 1. Note however that component document 2 remains unchanged—it remains at version B.

When the first and second instances of modular document A are later brought together (such as at either the source or destination computers or at some other location) and merged, the merge process will create a new version Z of component document 1 that is combined according to a merge definition. Thus, modular document A will have component document 1 with versions W, X, Y, and Z, with Z being a successor to all of the other three versions W, X, and Y and therefore the "latest" and the one that is used when component document 1 without reference to a specific version is requested.

In some embodiments, modular documents are defined using the Extensible Markup Language (XML). With XML, it is possible to add into a document the merge definition to define how different versions of the document are to be merged. In a more specific example, the merge definition can be expressed as an XSLT (eXtensible Stylesheet Language Transformations) transform that can be embedded into a document. In other embodiments, the modular documents and merge definitions can be according to other formats.

Figure 3:
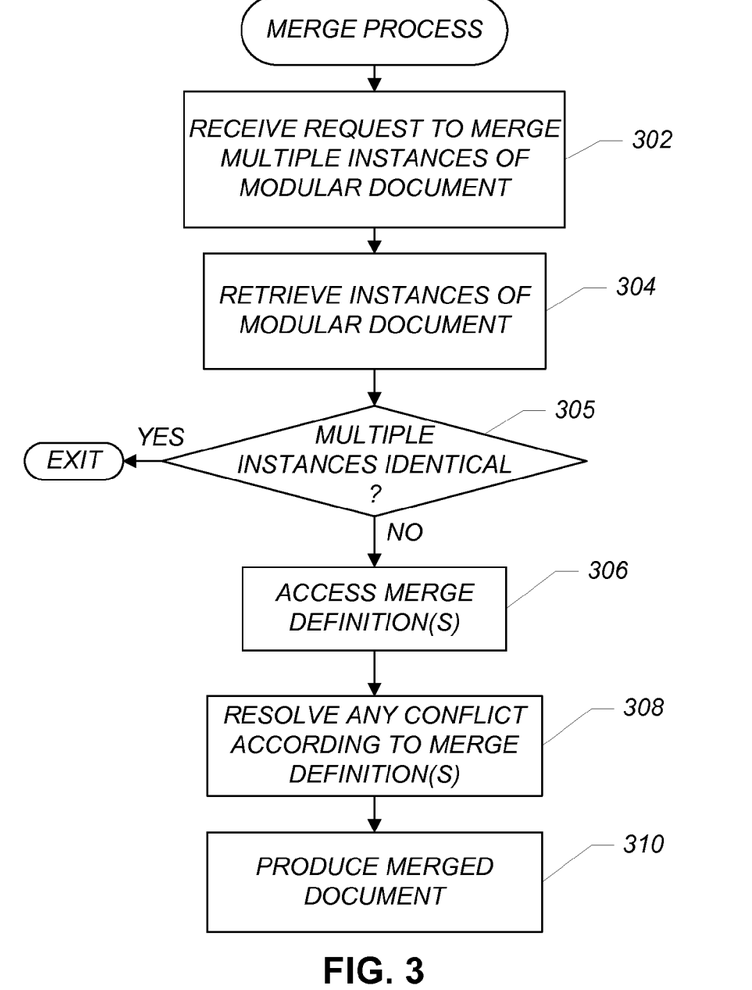
FIG. 3 is a flow diagram of a process of merging multiple modular documents, in accordance with an embodiment.

FIG. 3 is a flow diagram of a process of merging multiple instances of the modular document. The merging of multiple instances of a modular document can be performed at a document processing system. For example, an instance of a modular document can be loaded into the document processing system that already has another instance of the modular document. The loading of instances of a modular document into a document processing system can be part of a business process or workflow, such as due to a modular document being returned to an author after review. The document processing system can be represented by the source computer 100, one of the destination computers 102, or some other computer. The procedure of FIG. 3 can be performed by the merge module 117 or 129 of the source computer or destination computer, or by a similar merge module executed on another computer.

The merge module receives (at 302) a request to merge multiple instances of a modular document, where the request can be automatically generated as a result of detection of loading of a second instance of the modular document where a first instance already is present. Alternatively, the request can be received from a user, for example, through a graphical user interface (GUI).

In response to the request, the merge module retrieves (at 304) the multiple instances of the modular document. If the multiple instances of the modular document are determined (at 305) to be identical, then the merge process exits as the merge process does not have to be performed. On the other hand, if the multiple instances are different versions, then the merge process continues. To merge the multiple instances of the modular document, a merge definition is accessed (at 306). In one embodiment, the merge definition that is accessed is the merge definition in the first instance of the modular document. In a different embodiment, the merge definitions found in each of the first instance of the modular document and second instance(s) of the modular document are accessed to determine whether there are conflicts between the merge definitions found in the first instance of the modular document and in the second instance(s). A procedure to resolve conflicts in merge definitions is discussed further below.

In a modular document with multiple component documents, the component documents themselves can have merge definitions, which can also be accessed for potentially resolving any conflicts within the component documents.

Next, the merge module resolves (at 308) conflicts in the multiple instances of the modular document (including conflicts within different instances of component documents) according to the accessed merge definition(s). A conflict can be due to the first instance of the modular document having a first version of a particular component document, and a second instance of the modular document having a different version of the particular component document. The merge definition can specify which version of the particular component document is to be selected for use. In some embodiments, the merge definition allows production of a merge processing entity based on the definitions contained in the merge definition to merge the different versions of the modular document. A merged document is then produced (at 310).

Figure 4:
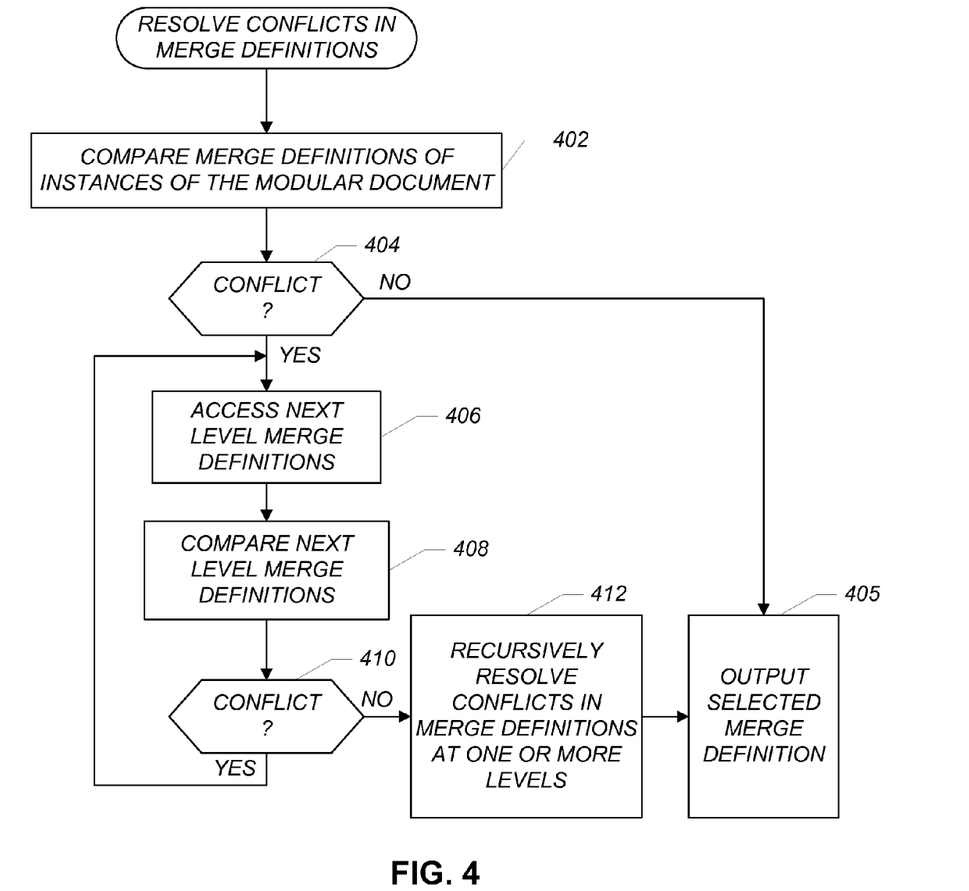
FIG. 4 is a flow diagram of resolving conflicts in merge definitions, according to a further embodiment.

FIG. 4 illustrates a process of resolving conflicts in merge definitions of the different instances of the modular document, according to a further embodiment. The process of FIG. 4 can also be performed by the merge module 117 or 129 in the source computer 100 or destination computer 102, or by a merge module in another computer. The merge definitions found in the multiple instances of the modular document are compared (at 402). Next, it is determined (at 404) if a conflict exists. If no conflict exists, then the merge definition is output (at 405) for use, and the merge definition conflict resolution process ends.

However, if a conflict in the merge definitions exists, then merge definitions at a next hierarchical level are accessed (at 406). A hierarchical arrangement of merge definitions can be defined. A first level of the merge definitions relate to resolving conflicts between different instances of the modular document. A second level of merge definitions specify how conflicts in the first level merge definitions are to be resolved. It is possible that the second level merge definitions can also have conflicts, in which case a third level of merge definitions are accessed to resolve conflicts in the second level merge definitions. This procedure can recursively proceed up the hierarchical arrangement of merge definitions. Ultimately, a final fallback conflict resolution policy exists to deal with cases where conflicts in the multiple levels of merge definitions cannot be resolved. Alternatively, if conflict resolution of conflict(s) in the merge definitions at multiple hierarchical levels is not possible, the conflicts can be presented to a user (such as through a GUI) to allow the user to select how conflict resolution is to be performed between merge definitions.

Next, the next level merge definitions are compared (at 408) to identify any conflicts in the next level merge definitions. If a conflict is present (as determined at 410) then the process proceeds to task 406 to recursively access the next level of merge definitions. The tasks of 406, 408, and 410 are repeated until no conflicts are detected, in which case any conflicts in the lower level merge definitions are recursively resolved (at 412). After conflicts in the lower level merge definitions have been resolved, a selected merge definition is output (at 405).

Figure 5:
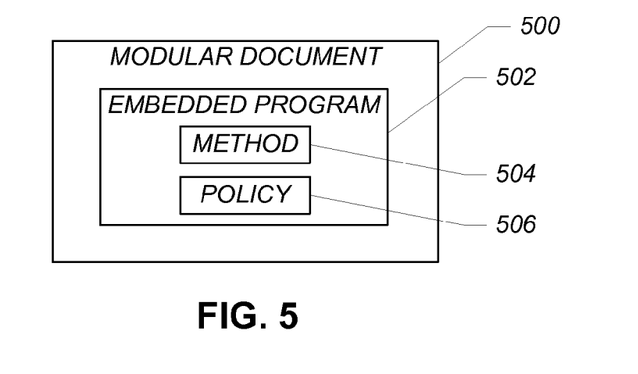
FIG. 5 illustrates a modular document with an embedded program, according to an alternative embodiment.

In alternative embodiments, conflict resolution can be defined using embedded programs provided in the modular documents. For example, as shown in FIG. 5, a modular document 500 includes an embedded program 502 can include one or more methods 504 (software routines) and one or more policies 506 designed specifically for the corresponding modular document. The policy 506 associated with the embedded program 502 controls how the embedded program resolves conflicts during merging of modular documents. In this embodiment, the policy 506 associated with the embedded program 502 can be considered the merge definition. A request to merge modular documents would then be the stimulus to cause the embedded programs in the modular documents to be invoked for conflict resolution to perform merging of the modular documents.

Instructions of software described above (including the merge software 117 and merge software 129 of FIG. 1) are loaded for execution on a processor (such as processor 114 or 124 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one or more CPUs in one or more computers). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving, by an electronic device, a first instance of a modular document composed of plural parts, wherein the modular document contains a merge definition;
   receiving, by the electronic device, a second instance of the modular document, wherein the first instance and the second instance of the modular document have been modified with respect to each other, wherein the second instance also contains a merge definition; and
   determining whether any conflict exists between the merge definition of the second instance and the merge definition of the first instance, wherein each of the merge definitions provides information regarding how conflicts in the first and second instances are to be resolved.

2. The method of claim 1, further comprising:
   in response to determining that the merge definition of the second instance is different from the merge definition of the first instance, resolving a conflict between the merge definition of the second instance and the merge definition of the first instance using a next level merge definition in one or both of the second instance and the first instance.

3. The method of claim 2, wherein resolution of the conflict between the merge definition of the second instance and the merge definition of the first instance results in an output merge definition that is used to merge the second instance with the first instance.

4. The method of claim 3, further comprising:
   determining whether any conflict exists between the next level merge definition of the second instance and the next level merge definition of the first instance; and
   resolving any conflict between the next level merge definition of the second instance and the next level merge definition of the first instance using a further level merge definition in one or both of the second instance and the first instance.

5. The method of claim 4, further comprising:
   in response to determining that conflicting merge definitions at multiple levels of a hierarchical arrangement of merge definitions cannot be resolved, using a fallback conflict resolution policy to resolve the conflicting merge definitions.

6. The method of claim 1, further comprising:
   resolving a conflict between the merge definition of the second instance and the merge definition of the first instance to produce an output merge definition.

7. The method of claim 6, wherein the plural parts of the modular document relate to respective different content of the modular document, where the different content are combinable for presentation of the modular document, the method further comprising:
   merging, by the electronic device, the second instance with the first instance, wherein any conflict between the second instance and the first instance is resolved according to the output merge definition.

8. The method of claim 7, wherein receiving the first instance, receiving the second instance, and merging the second instance with the first instance are performed by the electronic device that includes a document processing system.

9. The method of claim 6, wherein resolving the conflict comprises selecting one of the merge definitions as the output merge definition.

10. The method of claim 1, wherein receiving the first instance of the modular document composed of the plural parts comprises receiving the first instance of the modular document composed of plural component documents that are combined to allow presentation of the modular document.

11. The method of claim 1, further comprising embedding the merge definition of the first instance as a policy associated with an embedded program in the modular document.

12. The method of claim 1, wherein the merge definition of the first instance is embedded in the modular document that is according to an Extensible Markup Language (XML) format.

13. The method of claim 1, wherein the modular document is specified using an Extensible Markup Language (XML), and each of the merge definitions is expressed as an Extensible Stylesheet Language Transformations (XSLT) transform that is embedded in the corresponding instance of the modular document.

14. An article comprising at least one non-transitory computer-readable storage medium containing instructions that upon execution cause an electronic device to:
   receive a first instance of a modular document composed of plural parts, wherein the first instance of the modular document contains a merge definition;
   receive a second instance of the modular document that also contains a merge definition, wherein each of the merge definitions provides information regarding how conflicts in the first and second instances are to be resolved;
   resolve a conflict between the merge definitions in the first and second instances using another merge definition to produce an output merge definition; and
   merge the first and second instances of the modular document, wherein any conflict between the first and second instances is resolved according to the output merge definition.

15. The article of claim 14, wherein the plural parts of the modular document relate to respective different content of the modular document, where the different content are combinable for presentation of the modular document.

16. The article of claim 14, wherein merging the first and second instances produces a merged document.

17. The article of claim 14, wherein the modular document is an XML (Extensible Markup Language) document.

18. The article of claim 14, wherein the merge definition in the first instance specifies that a newer version of a part of the modular document replaces an older version of the part; and a change made by a higher-level user takes precedence over a change by a lower-level user.

19. The article of claim 14, wherein the modular document is specified using an Extensible Markup Language (XML), and each of the merge definitions is expressed as an Extensible Stylesheet Language Transformations (XSLT) transform that is embedded in the corresponding instance of the modular document.

20. A computer comprising:
a storage media to store a first instance of a modular document, wherein the modular document is composed of plural component documents relating to respective different content of the modular document, where the different content are combined to allow presentation of the modular document;
a processor to:
receive a second instance of the modular document;
access merge definitions contained in respective ones of the first instance and the second instance of the modular document, wherein each of the merge definitions provides information regarding how conflicts in the first and second instances are to be resolved;
resolve a conflict between the merge definitions in the first and second instances to produce an output merge definition; and
use the output merge definition to resolve any conflicts between the first instance and the second instance of the modular document.

21. The computer of claim 20, wherein the merge definitions contained in the first and second instances of the modular document are at a first level, and wherein at least one of the first instance and the second instance of the modular document includes a corresponding next level merge definition, the processor configured to further:
use the next level merge definition to resolve the conflict in the merge definition at the first level contained in the first instance and the merge definition at the first level contained in the second instance.

22. The computer of claim 20, wherein the processor is configured to further:
generate a merge processing entity from the output merge definition; and
apply the merge processing entity to the first and second instances of the modular document to produce a merged document.

23. The computer of claim 20, wherein the second instance of the modular document is received from a remote computer at which the second instance was modified with respect to the first instance.

24. The computer of claim 20, wherein the processor is configured to further present, to a user, any conflict between the first and second instances of the modular document not resolved by the output merge definition.

25. The computer of claim 20, wherein the modular document is specified using an Extensible Markup Language (XML), and each of the merge definitions is expressed as an Extensible Stylesheet Language Transformations (XSLT) transform that is embedded in the corresponding instance of the modular document.

\* \* \* \* \*